May 13, 1958  D. L. WILLIAMS  2,834,270
OPTICAL SYSTEM FOR PHOTOGRAPHY
Filed Oct. 30, 1951

INVENTOR
David L. Williams.
BY Whittemore, Hulbert & Belknap
ATTORNEYS

United States Patent Office 2,834,270
Patented May 13, 1958

2,834,270

OPTICAL SYSTEM FOR PHOTOGRAPHY

David L. Williams, Weehawken, N. J., assignor to L. Sarnoff-Williams Camera Corporation, a corporation of New York Application October 30, 1951, Serial No. 253,772

5 Claims. (Cl. 95—18)

The present invention relates to photography and more particularly to reproducing objectively the binocular image conveyed through the human eyes in the form of a single conventional photographic print in which a pair of monocular images are so coordinated that when viewed simultaneously by both eyes they will give an effect corresponding to images seen through normal binocular vision of the human eyes.

The principal object of the invention is so to photograph an image that, when reproduced in a single picture and viewed with both eyes open, the photograph accurately conveys to the viewer the three dimensional effect obtained by normal binocular vision. It is to be noted at the outset that binocular reproduction is to be distinguished from stereoscopic pictures which require the use of aids to permit viewing thereof by each eye independently of the other. In the present invention it is intended that an image be so reproduced that simultaneous viewing of monocular images is permitted and the picture thereof so blended that the desired third dimensional effect is obtained.

It is another object of the invention to provide adjustable refractors which enable one taking a photograph accurately to focus the camera and to determine the exact displacement of the pictures necessary to produce the effect of viewing and reproduction in the same manner as though the image were actually seen binocularly.

A further object of the invention is the provision of means for varying the lateral displacement of lenses to increase or decrease the angle of regard.

Figure 1:
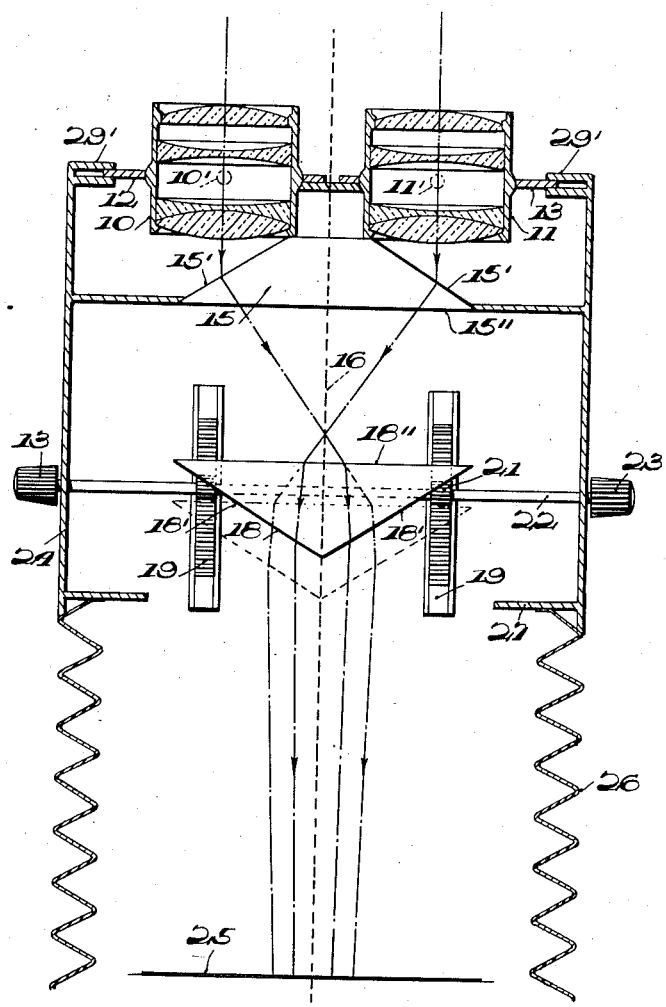
Figure 2:
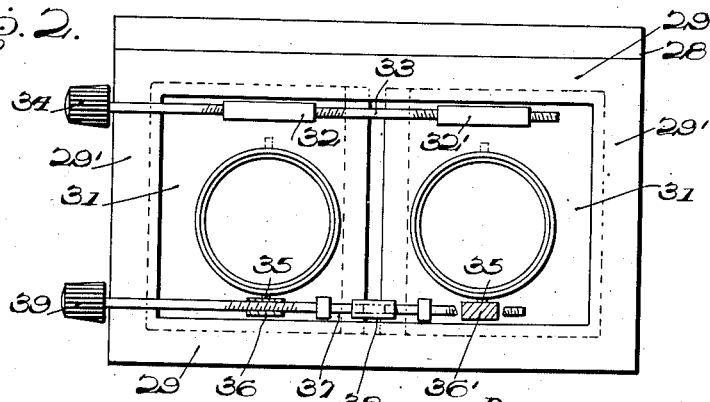

Other objects will be apparent from the following description of the invention when taken with the accompanying drawings, in which Fig. 1 is a diagrammatic plan view of the assembled parts of a camera illustrating one embodiment of the invention; and Fig. 2 is a front view of one form of mechanism for adjusting to lateral spacing of the lenses as well as for rotating the lenses about their vertical axes.

Referring to the drawings, it will be seen that matched and corrected lenses 10 and 11 are mounted on lens boards 12 and 13, the boards being slidably mounted in the front of the camera and adjustable laterally with respect to each other to vary the interocular spacing of the centers. The lenses are pivoted on their vertical axes 10′, 11′, to permit variation of the angle of regard. Positioned rearwardly of the lenses is a fixed prism 15, a transverse cross section of which forms an isosceles triangle, and which has forwardly converging faces 15′ angularly disposed to the horizontal axes of the lenses. The angularity of these faces is the same for both faces and the prism is symmetrically positioned with respect to the binocular axis 16 of the camera. The lenses are also symmetrically disposed to the axis 16, the means for laterally adjusting the lenses providing for equal displacement or spacing of the lenses from the camera axis. A light screen or baffle 17 surrounds the sides of the prism, preventing the passage of light through the camera except through the prism. The rear of face 15″ of prism 15 is normal to the axis 16.

Positioned rearwardly of prism 15 is a second isosceles prism 18 having its forward face 18″ normal to axis 16 and its rearward faces 18′ symmetrically disposed to and converging toward axis 16. Prism 18 is mounted for adjustment toward and from prism 15 and, in the embodiment illustrated, the means for adjusting prism 18 comprises racks 19 to which the prism is suitably secured and pinions 21 fast on shaft 22 having knobs 23 at its terminal end which extend through the camera housing 24. It will be apparent that by turning the knobs the relative positions of prisms 15 and 18 may be varied properly to focus the image on the focal plane 25, the latter being adjustable in the conventional manner, the usual bellows 26 being provided for this purpose.

The arrangement of the prisms and lenses is such that the rays projected through the spaced lenses are refracted by the forward prism to cross each other forwardly of the rear prism and again refracted by the rear prism to direct the transposed rays toward the focal plane substantially parallel to the axis of the camera. Thus it will be seen that the image projected through the right lens is focused, inverted, and transposed with its center to the left of the binocular axis on the focal plane and that there is a similar projection of a second image through the left lens. By properly adjusting the lenses, by mechanism to be described hereinafter, both as to interocular spacing and as to the angle of regard, a pair of monocular images, the centers of which are laterally displaced with respect to each other and to an amount corresponding to binocular vision, will be seen on the focus plate. Some initial adjustment of the lenses is necessary, but focusing to obtain a clear image and proper lateral displacement of the pair of images as seen through the focus plate is accomplished by moving the rear prism with respect to the fixed front prism. This pair of images will then be simultaneously reproduced on a photographic plate or film when the plate or film is substituted for the focus screen, and a shutter, such as that indicated at 27, is opened to expose the plate or film to the light passing through the lenses and prisms.

It should be noted that the monocular image transmitted through each lens is inverted and reversed in the focal plane. Were these images not transposed they would be offset in the direction opposite that from which they are offset by the human eyes. Hence, in order to produce a single picture in which the relation of the images is similar to that seen through binocular vision, it is necessary that they be transposed as is done by the optical system herein described.

The means for varying the interocular distance between the lenses is illustrated in Fig. 2 and comprises mechanism for slidably mounting the lenses on a lens board as well as means for rotating each lens about its vertical axis. The lens board is indicated at 28 and is provided with guides 29, 29′ in which the lens mounting plates 31 are adapted to slide. On each of the plates 31 there is secured a threaded nut 32, the threads being of opposite turns. Shaft 33 is provided with left and right threads cooperating with nuts 32, 32′ so that upon turning knob 34 in shaft 33 the plates are moved toward or away from each other equal distances from the center of the camera. The lenses 10 and 11 are pivoted on pins 35 forming the vertical axes 10, 10′ of the lenses and, although the rotation necessary for angular adjustment of the lenses is of a relatively small degree, the means for rotating the lenses is designed to effect turning the lenses through arcs of the same magnitude. As will be seen in Fig. 2, oppositely threaded worm wheels 36, 36′ are secured to the pivot pins, and a two-part worm shaft 37, having a splined telescoping connection 38, is provided with oppositely threaded worms which cooperate with the worm wheels to rotate the lenses in opposite directions and in equal angular degrees when knob 39 is turned.

In the embodiment of the invention illustrated herein, the angle of the sides of the prisms with respect to the bases thereof is approximately thirty degrees, but it is not intended that the apparatus be limited to the exact shape of the prisms shown. In principle, the arrangement of the prisms requires only that the pair of images be transposed and so offset with respect to each other that the illusion of third dimensional views be obtained.

It is also intended that the present camera be used for rephotographing stereo pairs of pictures. Thus the camera is capable of combining the two stereo pictures in their proper relationship in a single picture. The principle is also applicable to the enlargement of stereo pictures with a single photograph having the same characteristics as that referred to herein.

From the foregoing description of the camera it is to be noted that a pair of monocular images are projected on a single photographic plate, the centers of these images being separated a distance such that they are coordinated to produce a third dimensional effect. As is the case in natural binocular vision, a scene is directed to each lens and, by means of a pair of refracting prisms, the images are focused, inverted, transposed, and offset with respect to each other. At the same time they are blended into a single picture which produces the illusion of third dimension. The actual binocular image is formed from a combination of the sensations transmitted to separate eyes to produce a pattern of light and shades different from the two independent images from which it is formed. The relation of the lenses and prisms is such that the light is projected onto the photographic film substantially at a right angle thereto, the images are spread laterally in proportion to the distance between the lenses, and they are transposed. The scene is furthermore focused as to depth as well as to lateral displacement of the images.

Having described my invention what I claim as new and desire to secure by Letters Patent is:

1. In a camera for simultaneously projecting a pair of objective scenes on a single photosensitive element, a pair of lenses spaced laterally from the longitudinal axis of the camera a distance corresponding to the normal spacing of the human eyes, a focal plane in which said element is positioned, a pair of spaced isosceles prisms disposed symmetrically with respect to and on said axis and between said lenses and said focal plane, said prisms having their bases in adjacent relation and normal to said axis, and means for varying the distance between said prisms to converge the images in superposed relation on said element.

2. In a camera for simultaneously projecting a pair of objective scenes on a single photosensitive element, a pair of lenses spaced laterally from the longitudinal axis of the camera a distance corresponding to the normal spacing of the human eyes, a focal plane in which said element is positioned, a pair of spaced isosceles prisms disposed symmetrically with respect to and on said axis and between said lenses and said focal plane, said prisms having their bases in adjacent relation and normal to said axis, and means for varying the lateral displacement of said lenses with respect to said axis.

3. In a camera for simultaneously projecting a pair of objective scenes on a single photosensitive element, a pair of lenses spaced laterally from the longitudinal axis of the camera a distance corresponding to the normal spacing of the human eyes, a focal plane in which said element is positioned, a pair of spaced isosceles prisms disposed symmetrically with respect to and on said axis and between said lenses and said focal plane, said prisms having their bases in adjacent relation and normal to said axis, means for varying the lateral displacement of said lenses with respect to said axis, and means for varying the distance between said prisms to converge the images in superposed relation on said element.

4. In a camera for simultaneously projecting a pair of objective scenes on a single photosensitive element, a pair of lenses spaced laterally from the longitudinal axis of the camera a distance corresponding to the normal spacing of the human eyes, a focal plane in which said element is positioned, a pair of spaced isosceles prisms disposed symmetrically with respect to and on said axis and between said lenses and said focal plane, said prisms having their bases in adjacent relation and normal to said axis, means for moving said lenses about their vertical axes, and means for varying the distance between said prisms to converge the images in superposed relation on said element.

5. In a camera for simultaneously projecting a pair of objective scenes on a single photosensitive element, a pair of lenses spaced laterally from the longitudinal axis of the camera a distance corresponding to the normal spacing of the human eyes, a focal plane in which said element is positioned, a pair of spaced isosceles prisms disposed symmetrically with respect to and on said axis and between said lenses and said focal plane, said prisms having their bases in adjacent relation and normal to said axis, means for moving said lenses about their vertical axes, means for varying the lateral displacement of said lenses with respect to the longtiudinal axis of the camera, and means for varying the distance between said prisms to converge the images in superposed relation on said element, whereby the rays projected through said lenses will be transposed from one side of said longitudinal axis to the other side thereof, the rays being so refracted that they are projected on said element substantially normally to said element.

References Cited in the file of this patent

UNITED STATES PATENTS

| | | |
|---|---|---|
| 2,076,419 | Wiggin | Apr. 6, 1937 |
| 2,235,743 | Gagliardi | Mar. 18, 1941 |
| 2,298,586 | Phillips | Oct. 13, 1942 |

FOREIGN PATENTS

| | | |
|---|---|---|
| 326,470 | France | Apr. 29, 1903 |
| 188,093 | Great Britain | Nov. 9, 1922 |
| 504,152 | Great Britain | Apr. 20, 1939 |